United States Patent [19]

Iijima

[11] Patent Number: 5,678,029
[45] Date of Patent: Oct. 14, 1997

[54] MEMORY CARD AVAILABLE FOR VARIOUS FORMATS

[75] Inventor: Yasuo Iijima, Yokohama, Japan

[73] Assignee: Kabushiki Kaisha Toshiba, Kawasaki, Japan

[21] Appl. No.: 337,212

[22] Filed: Nov. 7, 1994

[30] Foreign Application Priority Data

Nov. 11, 1993 [JP] Japan .................. 5-282525

[51] Int. Cl.[6] .................................................. G06F 3/00
[52] U.S. Cl. ........................................................ 395/500
[58] Field of Search ............................................. 395/500

[56] References Cited

U.S. PATENT DOCUMENTS

| | | |
|---|---|---|
| 4,281,315 | 7/1981 | Bauer et al. ............ 340/825.08 |
| 4,604,710 | 8/1986 | Amezcua ............ 395/500 |
| 4,648,061 | 3/1987 | Foster ............ 395/200.1 |
| 5,060,140 | 10/1991 | Brown ............ 395/285 |
| 5,235,702 | 8/1993 | Miller ............ 395/600 |
| 5,461,488 | 10/1995 | Witek ............ 358/402 |

FOREIGN PATENT DOCUMENTS 0513507  11/1992  European Pat. Off. .

*Primary Examiner*—David Y. Eng
*Attorney, Agent, or Firm*—Cushman, Darby & Cushman IP Group of Pillsbury Madison & Sutro LLP

[57] ABSTRACT

In an IC card incorporating an IC chip having a data memory and a CPU for controlling the memory and designed to selectively send/receive data to/from an external apparatus, the first and second format groups of instruction data input from the external apparatus are identified. The identified first and second format groups are selectively processed in accordance with designation information stored in the data memory. The results of the processing are then output with formats corresponding to the first and second format groups.

8 Claims, 9 Drawing Sheets

RESPONSE "ID"  RESPONSE "CODE"

| "00" | "0000" |
|------|--------|
| "01" | "1000" |
| "02" | "3000" |
| "03" | "4000" |
| ⋮    | ⋮      |
| "30" | "9500" |

FOR SW. A

FIG. 8

RESPONSE "ID"  RESPONSE "CODE"

| "00" | "9000" |
|------|--------|
| "01" | "9100" |
| "02" | "6600" |
| "03" | "6800" |
| ⋮    | ⋮      |
| "30" | "6B00" |

FOR SW. B

FIG. 9

| RESPONSE "ID" | RESPONSE "CODE" |
|---|---|
| "00" | "9000" |
| "01" | "9100" |
| "02" | "6600" |
| "03" | "6800" |
| ⋮ | ⋮ |
| "30" | "6B00" |
| BCC | |

FOR SW. B

MEMORY CARD AVAILABLE FOR VARIOUS FORMATS

BACKGROUND OF THE INVENTION

1. Field of the Invention

The present invention relates to a memory card called an IC card, which incorporates an IC chip having a nonvolatile memory and a control element for controlling the memory.

2. Description of the Related Art

Recently, a great deal of attention has been paid to an IC card as a portable data storage medium, which incorporates an IC chip having a nonvolatile data memory and a control element, such as a CPU for controlling the memory. In an IC card of this type, the incorporated data memory is divided into a plurality of areas, and data used by application software is stored in the respective areas.

In an external apparatus handling such an IC card, a data string called a command is sent to the IC card. Upon reception of this data string, the IC card performs processings corresponding to control codes and parameters included in the command, and sends a text called a response to the external apparatus.

European Patent Application No. 0513507 discloses a portable electronic device which can send/receive the above-mentioned command and response using any of various different communication protocols. This device (IC card supporting multi-protocols) can be used with various external devices.

Under the current circumstances, the format and the coding scheme of the above command/response text have been standardized by known standardization organizations such as ISO. However, a text having a format different from the standard format is sometimes used in an existing IC card system. In this case, different IC cards must be provided for a conventional system as well as a future system conforming to the ISO standard. Therefore, a user must selectively use a plurality of IC cards in accordance with different systems.

SUMMARY OF THE INVENTION

It is an object of the present invention to provide a memory card compatible with a plurality of systems handling command/response texts with different specifications.

To achieve the above object, a memory card of the present invention comprises a memory for storing first designation information and second designation information, the first designation information designating a first command/response text format, and the second designation information designating a second command/response text format; a control unit for selectively designating one of the first and second command/response text formats in accordance with the first or second designation information stored in the memory, so as to exchange a given command/response text with an external device; a conversion part for, when the second command/response text format is designated by the control unit, converting the designated second command/response text format into the first command/response text format; and an execution unit for executing a prescribed process in accordance with one of the first command/response text format and the second command/response text format converted by the conversion part.

According to the present invention, there is provided a memory card (e.g., an IC card) compatible with a plurality of systems which handle command/response texts with different specifications (or formats). In addition, especially because response codes can be registered in the memory card after it is manufactured, the memory card can be manufactured before the specification (or format) of a response text in a prescribed system is determined.

Additional objects and advantages of the invention will be bet forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5H show the formats of command and response texts corresponding to switches A and B which are used in the memory card according to the embodiment in FIG. 2, in which FIGS. 5A to 5D are formats for switch B, and FIGS. 5E to 5H are formats for switch A;

FIG. 8 is a view showing a conversion table for converting a response ID into a response code corresponding to switch A;

FIG. 9 is a view showing a conversion table for converting a response ID into a response code corresponding to switch B;

DETAILED DESCRIPTION OF THE PREFERRED EMBODIMENTS

An embodiment of the present invention will be described below with reference to the accompanying drawings.

Figure 1:
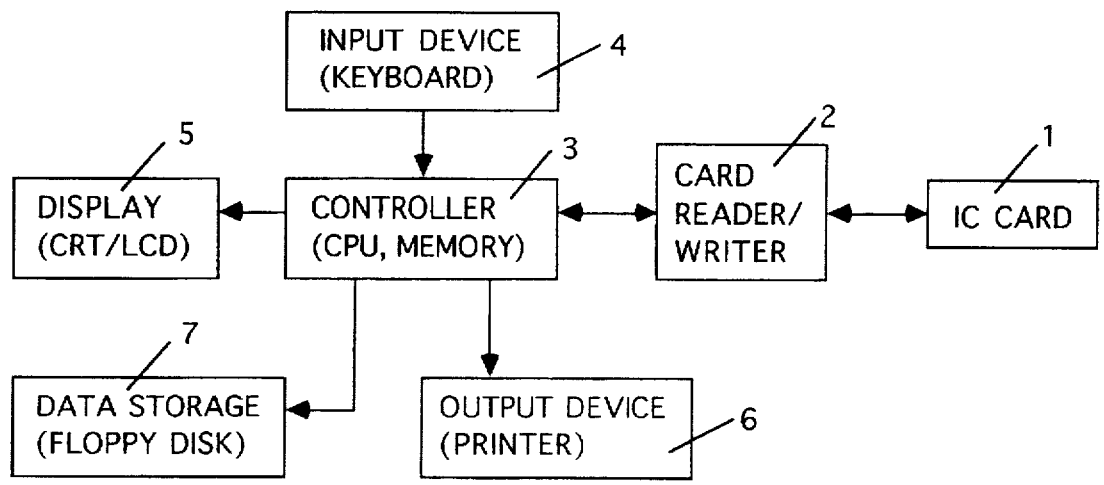
FIG. 1 is a block diagram showing the arrangement of a card handling apparatus for handling a memory card (IC card) according to an embodiment of the present invention.

FIG. 1 shows an arrangement of a card handling apparatus (for example a terminal apparatus in a financial system, a shopping system, or the like) to which a memory card or IC card of this embodiment is applied. This apparatus is designed such that IC card 1 can be connected to controller 3 constituted by a CPU, a memory, and the like via card reader/writer 2. The apparatus includes controller 3, input device (keyboard) 4, display (CRT/LCD) 5, output device (printer) 6, and data storage (floppy disk) 7.

Figure 2:
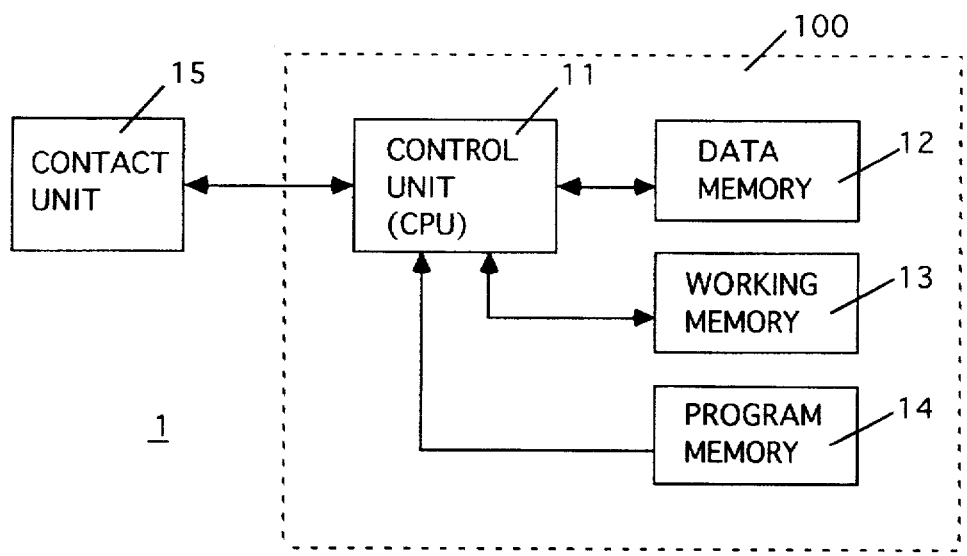
FIG. 2 is a block diagram showing the internal arrangement of a memory card according to an embodiment of the present invention.

FIG. 2 shows an arrangement of IC card 1. IC card 1 is constituted by control unit (CPU) 11, nonvolatile data memory 12 whose stored contents can be erased, working memory 13, program memory 14, and contact unit 15 for electrical contact with card reader/writer 2. Of these components, components (control unit 11, data memory 12, working memory 13, and program memory 14) enclosed within broken line 100 are integrated into one IC chip (or plurality of IC chips). This IC chip is embedded in the IC card body.

Data memory 12 is used to store various data and is constituted by an EEPROM or the like. Working memory 13 serves to temporarily hold data to be processed when control unit 11 performs data processing. For example, working memory 13 is constituted by a RAM. Program memory 14 is constituted by, e.g., a mask ROM. Processing programs and the like are stored in program memory 14.

Figure 3:
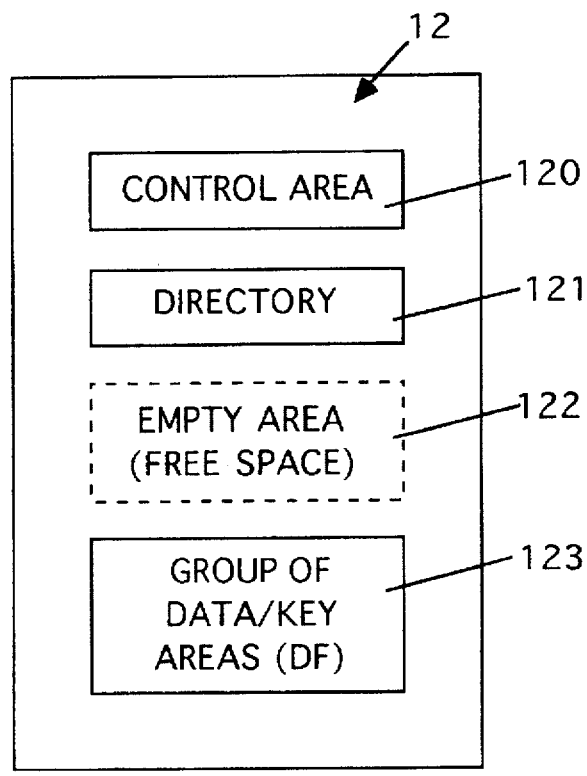
FIG. 3 is a view for explaining the stored contents of a data memory arranged in the card in FIG. 2.

As shown in FIG. 3, data memory 12 is divided into control area 120, directory 121, empty area 122, and group of data/key areas 123. The respective areas are managed by directory 121.

Figure 4:
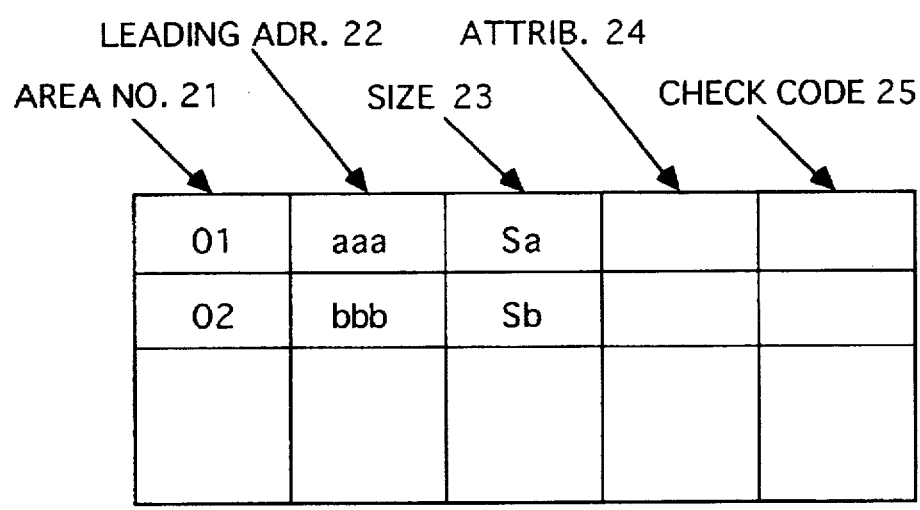
FIG. 4 is a view showing the arrangement of directory information set in correspondence with the stored contents of the data memory in FIG. 3.

As shown in FIG. 4, directory 121 is formed as a set of area definition information constituted by area number (AID) 21 of each area, leading address 22 of each area, size 23, attribute 24, and check code 25. For example, leading address 22 of area [01] is "aaa", and the size of the area is Sa bytes.

Switch A or B (to be described below) is 1-byte data stored in control area 120 in data memory (EEPROM) 12. When this 1-byte data is "00" (Hex), it indicates switch A (indicating, for example, an ISO standard format). Otherwise, the 1-byte data indicates switch B (indicating, for example, a format unique to each IC card maker).

FIGS. 5A to 5H, respectively, show the formats of the command/response texts corresponding to the respective switches (A/B).

Figure 5A:
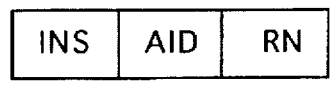

FIG. 5A shows the format of a data read command text for switch B. As shown in FIG. 5A, this command text is constituted by function code INS indicating the function of a command, data AID indicating an area number, and data RN indicating a record number in the area. Especially, when record number RN is "00", it indicates that access to a record in a current state (usable state) (to be referred to as current record CR hereinafter) is requested.

Figure 5B:
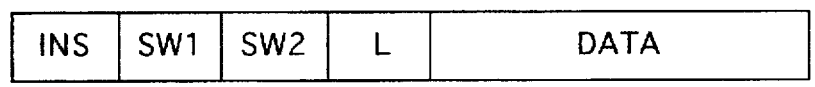

FIG. 5B shows the format of a data read response text for switch B. As shown in FIG. 5B, the response text is constituted by data INS for echoing back INS in the command text, data SW1 and SW2 for storing a response code as a processing result (in units of bytes), data L indicating the length of readout record, and data DATA of the readout record.

Figure 5C:
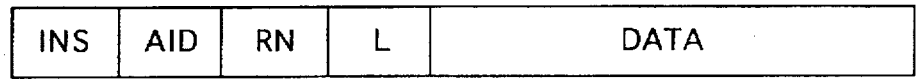

FIG. 5C shows the format of a data write command text for switch B. As shown in FIG. 5C, the command text is constituted by function code INS indicating the function of a command, data AID indicating an area number, data RN indicating a record number in the area, data L indicating the length of a record to be written, and data DATA of the record to be written. Especially, when record number RN is "00", it indicates that access to current record CR is requested.

Figure 5D:
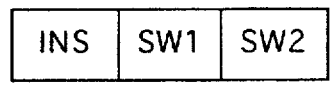

FIG. 5D shows the format of a data write response text for switch B. As shown in FIG. 5D, the response text is constituted by data INS for echoing back INS in the command text and data SW1 and SW2 for storing a response record as a processing result.

If an error is caused during processing of the command text shown in FIG. 5A, and there is no record to be output, only function code INS and response codes SW1 and SW2 are output, as a response text, according to the format shown in FIG. 5D.

Figure 5E:
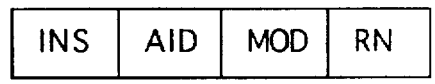

FIG. 5E shows the format of a data read command text for switch A. As shown in FIG. 5E, the command text is constituted by function code INS indicating the function of a command, data AID indicating an area number, data MOD indicating the current read mode, and data RN indicating a record number in the area.

For example, data MOD indicating a mode consists of one byte. Data MOD is set to be "00", "01", "02", or "03". "00" indicates that current record CR is requested as a target to be accessed. "01" indicates that a record following the current record is requested as a target to be accessed. "02" indicates that a record preceding the current record is requested as a target to be accessed. "03" indicates that a record having a record number designated by data RN is requested as a target to be accessed.

Figure 5F:

FIG. 5F shows the format of a data read response text for switch A. As shown in FIG. 5F, the response text is constituted by data L indicating the length of a readout record, data DATA of the readout record, and data SW1 and SW2 for storing a response record as a processing result.

Figure 5G:
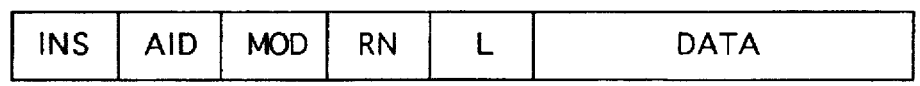

FIG. 5G shows the format of a data write command text for switch A. As shown in FIG. 5G, the command text is constituted by function code INS indicating the function of a command, data AID indicating an area number, data MOD indicating the current write mode, data RN indicating a record number in the area, data L indicating a record to be written, and data DATA of the record to be written.

Figure 5H:
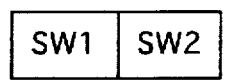

FIG. 5H shows the format of a data write response text for switch A. As shown in FIG. 5H, the response text is constituted by data SW1 and SW2 for indicating a processing result by codes.

If an error occurs during processing of the command text shown in FIG. 5E, and there is no record data to be output, only response codes SW1 and SW2 are output, as a response text, according to the format shown in FIG. 5H.

The operation of IC card 1 shown in FIG. 2 in the above arrangement will be described next with reference to the flow charts shown in FIGS. 6 and 7.

When IC card 1 is electrically activated, control unit (CPU) 11 checks, by referring to the switch in data memory 12, whether the value of the switch indicates switch A or B (step ST101). If the value of the switch indicates switch A (YES in step ST101), CPU 11 sends initial response data called Answer to Reset corresponding to switch A to the card handling apparatus side in FIG. 1 (step ST102). The flow then advances to step ST104 to wait for reception of a command text. If the value of the switch indicates switch B (NO in step ST101), CPU 11 sends initial response data corresponding to switch B (step ST103). Similarly, the flow advances to step ST104 to wait for reception of a command text.

In step ST104, CPU 11 receives a command text transmitted from an external apparatus (the card handling apparatus in FIG. 1) at a protocol/transmission rate corresponding to switch A or B. When this command is received (YES in step ST104), the flow advances to step ST105. If the value of the switch indicates switch A (YES in step ST105), the flow advances to step ST106. If the value of the switch indicates switch B (NO in step ST105), the flow advances to step ST107.

In step ST106, CPU 11 checks whether the received command text is a command for switch A. If YES in step ST106, the flow advances to step ST110. If NO in step ST106, the flow advances to step ST108 to set response ID (identification information) indicating no command in a predetermined register (not shown) in working memory 13 (or CPU In step ST107, CPU 11 checks whether the received command text is a command for switch B. If YES in step ST107, CPU 11 converts the command text for switch B into a command text for switch A, as will be described later (step ST109). The flow then advances to step ST110. If NO in step ST107, the flow advances to step ST108. This command text conversion (step ST109) is one of the key points of the present invention.

In step ST110, CPU 11 searches directory 121 in FIG. 4 for area ID of a target (to be accessed) designated by the command text to check whether the designated ID exists. If it is determined that the designated ID does not exist (NO in step ST110), the flow advances to step ST111 to set response ID indicating improper area ID designation in a predetermined register in working memory 13.

Figure 7:
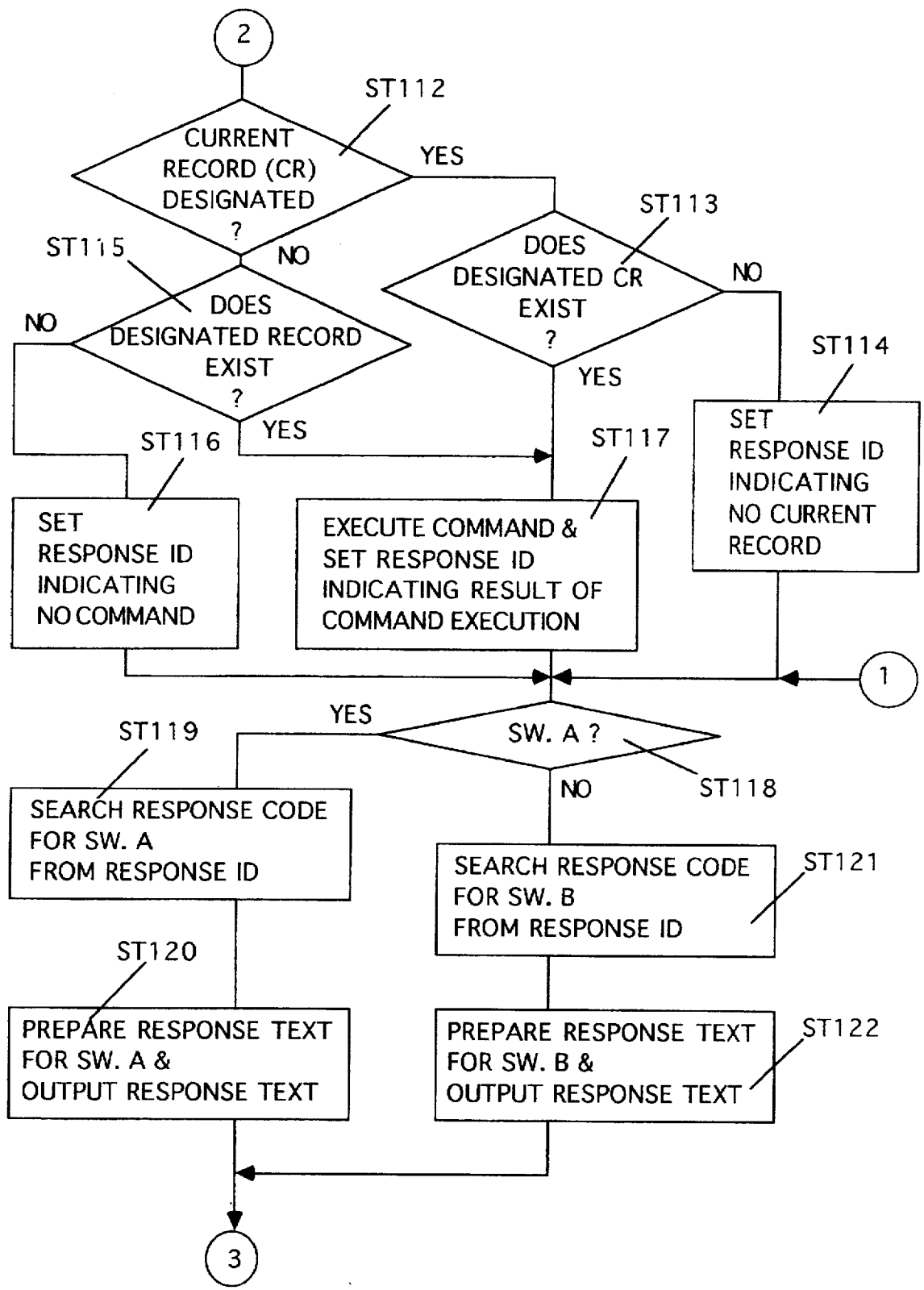
FIG. 7 is a flow chart for explaining internal card processing after formats are unified by the processing in FIG. 6.

If it is determined in step ST110 that the designated area ID exists (YES in step ST110), the flow advances to step ST112 in FIG. 7. In step ST112, CPU 11 checks whether current record CR is accessed in the area to be searched. If YES in step ST112, the flow advances to step ST113. If NO in step ST112, the flow advances to step ST115.

In step ST113, CPU 11 refers to "current record information" stored in working memory (RAM) 13 to check whether current record CR exists in a file to be searched. This "current record information" consists of two bytes. When this value is "FFFF" (Hex), it indicates that no current record exists.

If it is determined in step ST113 that current record CR does not exist (NO in step ST113), the flow advances to step ST114 to set response ID indicating no current record in a predetermined register in working memory 13. If it is determined that current record CR exists (YES in step ST113), the flow advances to step ST117.

In step ST115, CPU 11 checks whether a record having record number RN designated by the command text exists in the file to be searched. If it is determined that the designated record does not exist (NO in step ST115), the flow advances to step ST116 to set response ID indicating no designated record in a predetermined register in working memory 13. If it is determined in step ST115 that the designated record exists, the flow advances to step ST117.

In step ST117, CPU 11 processes the designated record in the file designated by the command text in accordance with a command code (command execution), and sets the processing result, as response ID, in a predetermined register in working memory 13. The flow then advances to step ST118.

Note that after responses ID are set in the predetermined registers in working memory 13 in steps 108, 114, and 116, respectively, the flow advances to step ST118.

In step ST118, CPU 11 checks the state of the switch again. If the value of the switch indicates switch A (YES in step ST118), the flow advances to step ST119. If the value of the switch indicates switch B (NO in step ST118), the flow advances to step ST121.

In step ST119, conversion data (conversion table) like the one shown in FIG. 8 is used to convert response ID for switch A into a response code. If, for example, response ID in a predetermined register indicates "00" (Hex), response ID is converted into response code "0000". If response ID indicates "03" (Hex), response ID is converted into response code "4000".

Subsequently, the flow advances to step ST120 to prepare a response text for switch A and output it. The flow then returns to step ST104 to wait for reception of a command text.

In step ST121, conversion data (conversion table) like the one shown in FIG. 9 is used to convert response ID for switch B into a response code. If, for example, response ID in a predetermined register indicates "00" (Hex), response ID is converted into response code "9000". If response ID indicates "03" (Hex), response ID is converted into response code "6800".

Subsequently, the flow advances to step ST122 to prepare a response text for switch B and output it. The flow then returns to step ST104 to wait for reception of a command text.

The response ID/response code conversion data (FIGS. 8 and 9) used in steps 119 and 121 may be stored in program memory (mask ROM) 14 for storing program data or control area 120 in data memory (EEPROM) 12. Especially, when such conversion data is to be stored in data memory 12, it is desirable that binary check code BCC or the like for checking the validity of data be added to the conversion data, as shown in FIG. 10, so as to check the presence/absence of an error in referring to the conversion data.

Figures 10, 11:
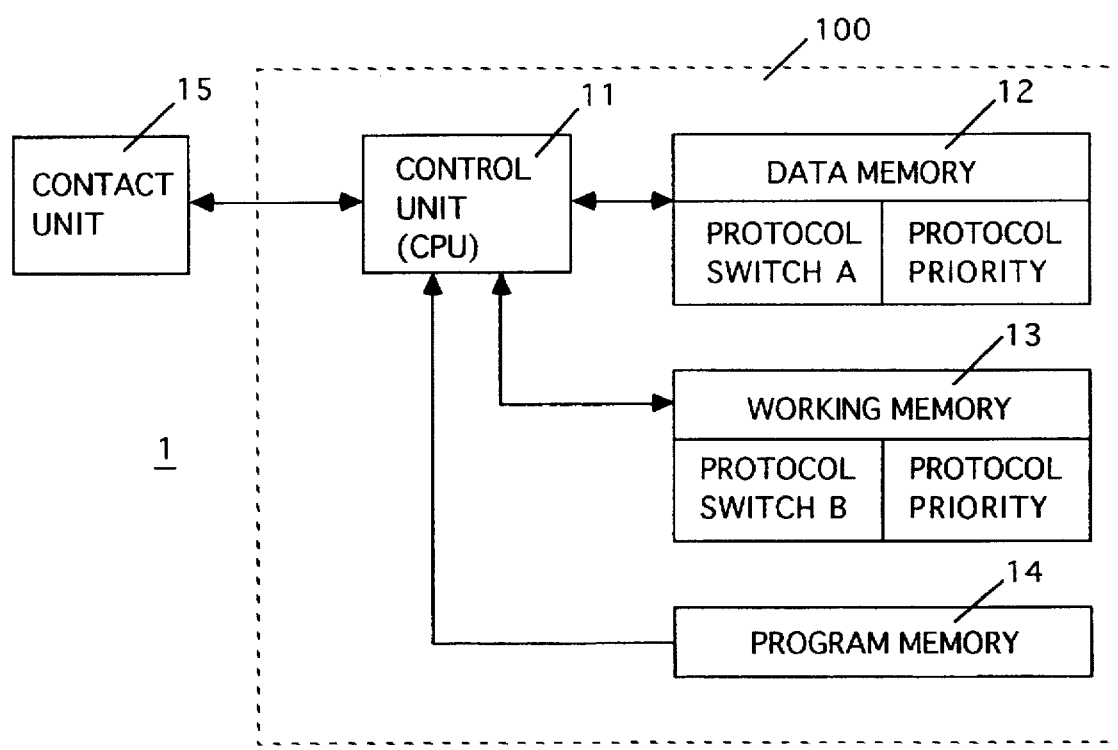
FIG. 10 is a view showing another conversion table for converting a response ID into a response code corresponding to switch B.
FIG. 11 is a block diagram showing the internal arrangement of a memory card according to another embodiment of the present invention.

If, for example, the conversion data for switch B in FIG. 10 is stored in data memory 12, check code BCC is checked in referring the conversion data in step ST121. If the validity of the conversion data in FIG. 10 cannot be confirmed, the conversion data shown in FIG. 8 is used, and information indicating that the conversion data in FIG. 10 is destroyed is added to a response code. For example, if the least significant portion (least significant four bits) of a response code is "0", it indicates that the conversion data is proper. If the least significant nibble is "1", it indicates that the conversion data is improper.

Processing to be performed when the four types of commands shown in FIGS. 5A, 5C, 5E, and 5G are input to IC card 1 will be described next.

Assume that, in order to conform to the conversion data shown in FIGS. 8 and 9, responses ID indicating the respective processing results are set to be "01" in step ST108, "02" in step ST111, "03" in step ST114, "30" in step ST116, and "00" in step ST117.

If it is determined in step ST104 that a command text is received, CPU 11 checks the content of the switch (step ST105). If the value of this switch is "00", it indicates switch A. In this case, CPU 11 refers to data INS to check whether the input command text is the one shown in FIGS. 5E or 5G (step ST106). Assume that data INS of the input command text corresponds neither of the data FIGS. 5E and 5G (NO in step ST106). In this case, since response ID indicating no command is "01", response code "1000" can be obtained by search processing in step ST119 (see FIG. 8). Therefore, CPU 11 of IC card 1 uses the format shown in FIG. 5H to respectively set "10" and "00" in data SW1 and SW2, thereby outputting the resultant data, as a response text, to the external apparatus (the apparatus shown in FIG. 1) (cf. the second row in FIG. 8).

Subsequently, the flow advances to step ST110 to search directory 121 for area definition information having an area number identical to the value of area number data AID in the command text. If no identical area number is found, the flow advances to step ST111 to set "02" as response ID. Thereafter, the same processing as that performed when response ID is "01" is performed. As a result, a response text having the same format as that shown in FIG. 5H is output with "30" and "00" being respectively set in data SW1 and SW2 (cf. the third row in FIG. 8).

In step ST112, CPU 11 refers to data MOD indicating a mode in the command text. If the value of data MOD is "03", CPU 11 determines an access to a record designated by record number RN. Otherwise, CPU 11 determines an access to a record with reference to current record CR.

If an access to a record with reference to current record CR is determined (YES in step ST112), CPU 11 checks in step ST113 whether the content of current record information stored in a predetermined area of working memory 13 is "FFFF". If YES in step ST113, the flow advances to step ST114 to set "03" as response ID. As a result, a response text having the same format as that shown in FIG. 5H is output with "40" and "00" being respectively set in data SW1 and SW2 (cf. the fourth row in FIG. 8).

In step ST115, CPU 11 checks the content of an area as an access target to check whether a record having a number designated by data RN exists in the command text. If it is determined that the record does not exist (NO in step ST115), the flow advances to step ST116 to set "30" as response ID. As a result, a response text having the same format as that shown in FIG. 5H is output with "95" and "00" being respectively set in data SW1 and SW2 (cf. the last row in FIG. 8).

Similarly, if the result of command text processing is proper (YES in step ST113 or 115), the flow advances to step ST117 to set "00" as response ID. If, therefore, the command text has the same format as that shown in FIG. 5E, a response text having the same format as that shown in FIG. 5F is output with "00" and "00" being respectively set in data SW1 and SW2 (cf. the first row in FIG. 8). If the command text has the same format as that shown in FIG. 5G, a response text having the same format as that shown in FIG. 5H is output with "00" and "00" being respectively set in data SW1 and SW2.

Processing of a command text for switch B will be described next.

If a command text is received in step ST104, CPU 11 checks the content of the switch. If the value of this switch is a value other than "00", switch B is determined. CPU 11 checks on the basis of data INS whether the input command text has a format identical to that shown in FIG. 5A or 5C (step ST107). Assume that data INS of the input command text corresponds neither of the formats (NO in step ST107). In this case, since response ID indicating no command is "01", response code "9100" is obtained by the search processing in step ST121. Therefore, "91" and "00" are respectively set in data SW1 and SW2 according to the format shown in FIG. 5D, and the resultant data is output, as a response text, to the external apparatus (cf. the second row in FIG. 9).

If it is determined in step ST107 that the input command text is a command for switch B (YES in step ST107), the format shown in FIG. 5A is converted into the format shown in FIG. 5E, and the format shown in FIG. 5C is also converted into the format shown in FIG. 5G (step ST109). If, for example, data RN in FIG. 5A is "00", data MOD in FIG. 5E is set to be "00". If data RN in FIG. 5A is a value other than "00", data MOD in FIG. 5E is set to be "03". In addition, the value of data RN in FIG. 5A substitutes for data RN in FIG. 5E.

In format conversion from the format in FIG. 5C to the format in FIG. 5G (conversion from a format for switch B to a format for switch A), similar to the above operation, certain values are set for data MOD and data RN, and write data DATA is moved.

After this conversion, in each subsequent step, the same processing as that performed when a command text having a format identical to that shown in FIGS. 5E or 5G is performed. However, different processing is performed after step ST118 in which the processing result is set as response ID.

In this case, if there is data to be processed in command execution in step ST117, the format shown in FIG. 5B is used. Otherwise, the format shown in FIG. 5D is used. Subsequently, response codes obtained from response ID through the conversion data shown in FIG. 9 are respectively set in data SW1 and SW2, and the resultant data is output as a response text.

With this operation, the format of a command/response text and the value of a response code are modified and sent/received in accordance with the state of IC card 1 (according to the conversion tables shown in FIGS. 8 and 9). With such a means, in using IC card 1 in two or more systems, the user need not change command/response texts used in the systems, the interpretation schemes for response codes, and the like.

This processing may be modified such that only a response code is changed depending on the type of switch (A/B) without changing the format of a command/response text.

Especially because response ID/response code conversion data (conversion tables) can be stored in programmable data memory 12 such as an EEPROM, registration of conversion data can be performed after IC card 1 is manufactured. Therefore, even after IC card 1 is manufactured, IC card 1 can be made compatible with each system.

In addition, data designating a switch (A or B) to be stored in data memory 12 may be changed in value by a special command text. With this arrangement, in using IC card 1, the user can select a format suitable for a command/response text. Note that this data changing operation may be performed upon enabling of a reset signal to an IC card, which is used in a protocol switching function disclosed in U.S. Ser. No. 215,573 filed on Mar. 22, 1994 by the present inventor. All the contents disclosed in U.S. Ser. No. 215,573 are incorporated in the specification of the present invention.

FIG. 11 shows another arrangement of IC card 1. IC card 1 is constituted by CPU 11 as a control section, nonvolatile data memory 12 capable of rewriting the stored content, working memory 13, program memory 14, and contact unit 15 for electrical contact with card reader/writer 2. Of these components, CPU 11, data memory 12, working memory 13, and program memory 14, which are enclosed within the broken line, are integrated into one chip. This chip is embedded in the IC card body. The section enclosed within the broken line may be constituted by a combination of two or more chips.

Data memory 12 is used to store various data such as protocol switch A and protocol priority, and is constituted by, e.g., an EEPROM. Working memory 13 serves to temporarily hold data (including protocol switch B, protocol priority, and the like) to be processed when control unit 11 performs data processing. For example, working memory 13 is constituted by a RAM. Program memory 14 is constituted by, e.g., a mask ROM and serves to store programs used by CPU 11.

Card reader/writer 2 in FIG. 1 serves to send/receive function code data and data (to be processed) between IC card 1 and controller 3. Card reader/writer 2 also has a function of performing a one-instruction/one-response operation with respect to IC card 1 on the basis of a macro instruction from controller 3.

Figure 12:
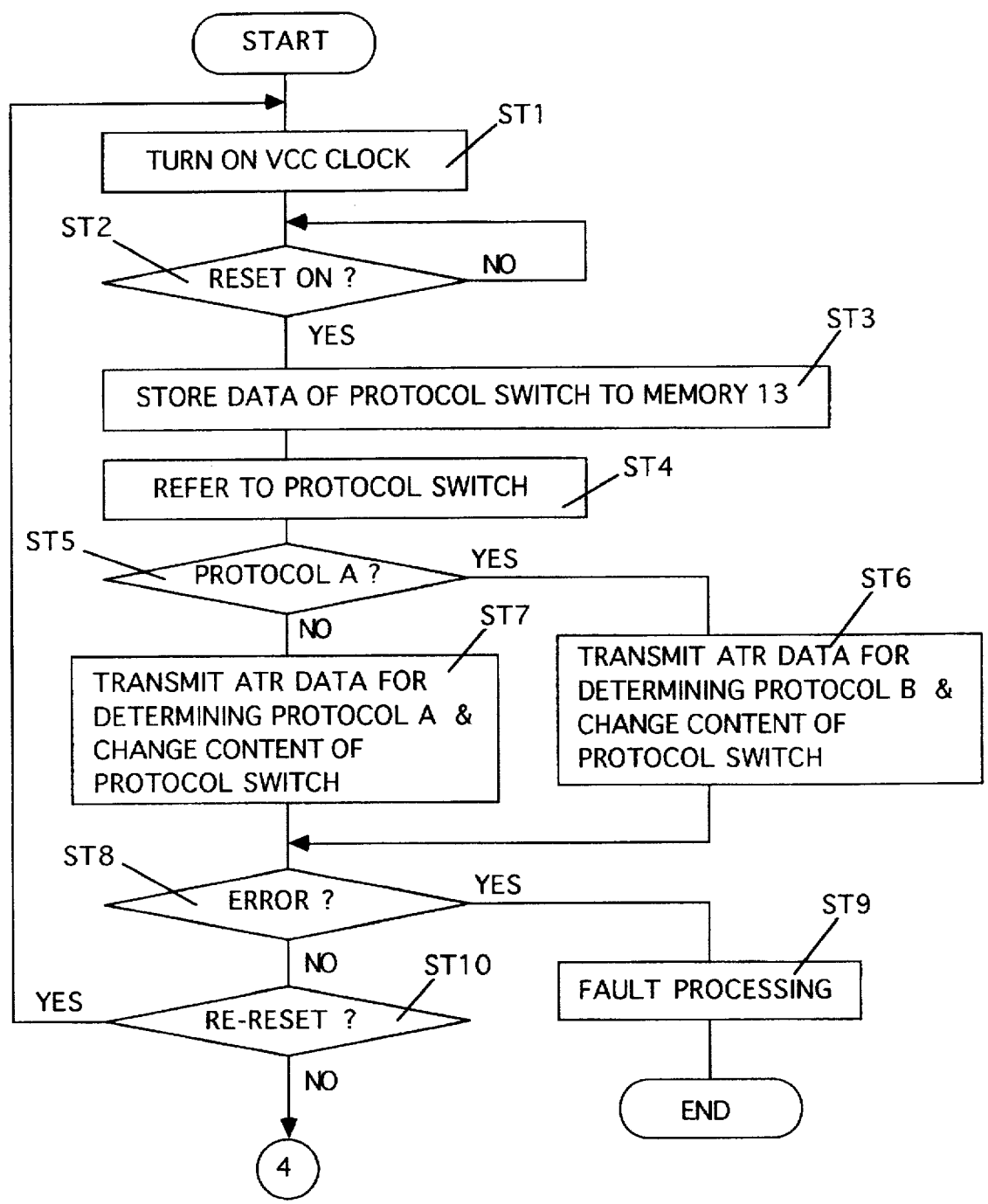
FIG. 12 is a flow chart for explaining the operation of a protocol switch in using the memory card in FIG. 11, which operation is combined with the internal card processing in FIGS. 6 and 7.

The operation of another embodiment having the above arrangement will be described below with reference to the flow chart shown in FIG. 12. Assume that in this embodiment, two types of protocols, i.e., protocols A and B, are used as transmission protocols supported by IC card 1, and initial response data (called Answer to Reset) corresponding to these protocols are transmitted at different transmission rates.

While IC card 1 is inserted in card reader/writer 2, IC card 1 receives operating power (Vcc), a clock signal, and a reset signal from card reader/writer 2 via 10 the respective contacts of contact unit 15 (step ST1), and is started after being reset once (YES in step ST2) in accordance with an electrical activation sequence defined by ISO/IEC 7816-3 standard.

IC card 1 stores (copies) the content of "protocol switch" stored in data memory 12 at a predetermined location in working memory (RAM) 13 immediately after an internal program stored in program memory 14 is started (step ST3). CPU 11 of IC card 1 refers to the content of the copied protocol switch (step ST4) to check whether the content of the protocol switch is set to protocol A or B (step ST5).

If the transmission protocol copied to working memory 13 is protocol A (YES in step ST5), CPU 11 transmits initial response data (ATR) corresponding to protocol B to card reader/writer 2 at a corresponding transmission rate (step ST6). Prior to this operation, CPU 11 of IC card 1 performs self-diagnosis processing to check the functions of the registers and the RAM incorporated in IC card 1. Upon transmission of the initial response data (ATR), CPU 11 of IC card 1 switches the content of "protocol switch" stored at the predetermined location in working memory (RAM) 13 to protocol B (step ST6).

If the transmission protocol set in "protocol switch" is protocol B (NO in step ST5), CPU 11 transmits initial response data (ATR) corresponding to protocol A to card reader/writer 2 at a corresponding transmission rate. In this case, similar to the case of protocol A, CPU 11 of IC card 1 performs self-diagnosis processing during a self-diagnosis period to check the functions of the registers, the RAM, and the .like in IC card 1. Thereafter, CPU 11 switches the contents of "protocol switch" stored in working memory 13 to protocol A (step ST7).

If an error is determined upon completion of the above processing (YES in step ST8), fault processing is performed (step ST9), and the flow comes to an end.

Figure 6:
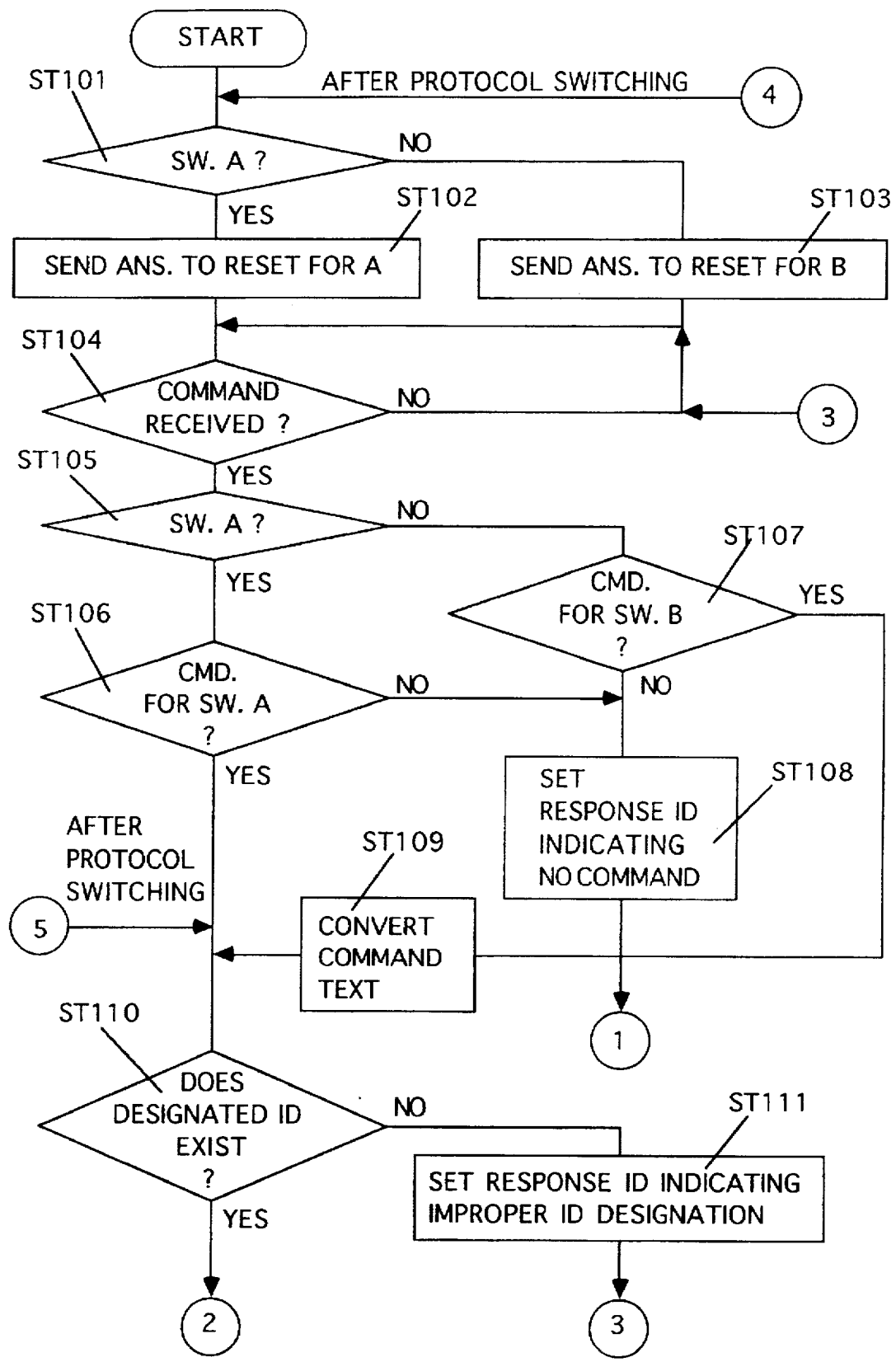
FIG. 6 is a flow chart for explaining the operation of a format switch in using the memory card in FIG. 2, in which two types of formats (A and B) are unified into one type of format (A)

If no error is determined (NO in step ST8), and a re-reset operation is not performed (NO in step ST10), the flow advances to step ST101 in FIG. 6 to perform the above-described command switch switching operation.

Assume that electrical activation, i.e., a re-reset operation (activating only a reset signal) is performed (YES step ST10) without sending/receiving command/response texts. In this case, since the content of "protocol switch" is not restored (kept as protocol B) to the initial content (protocol A), another protocol (B) (supported next) is set as a current protocol.

Figure 13:
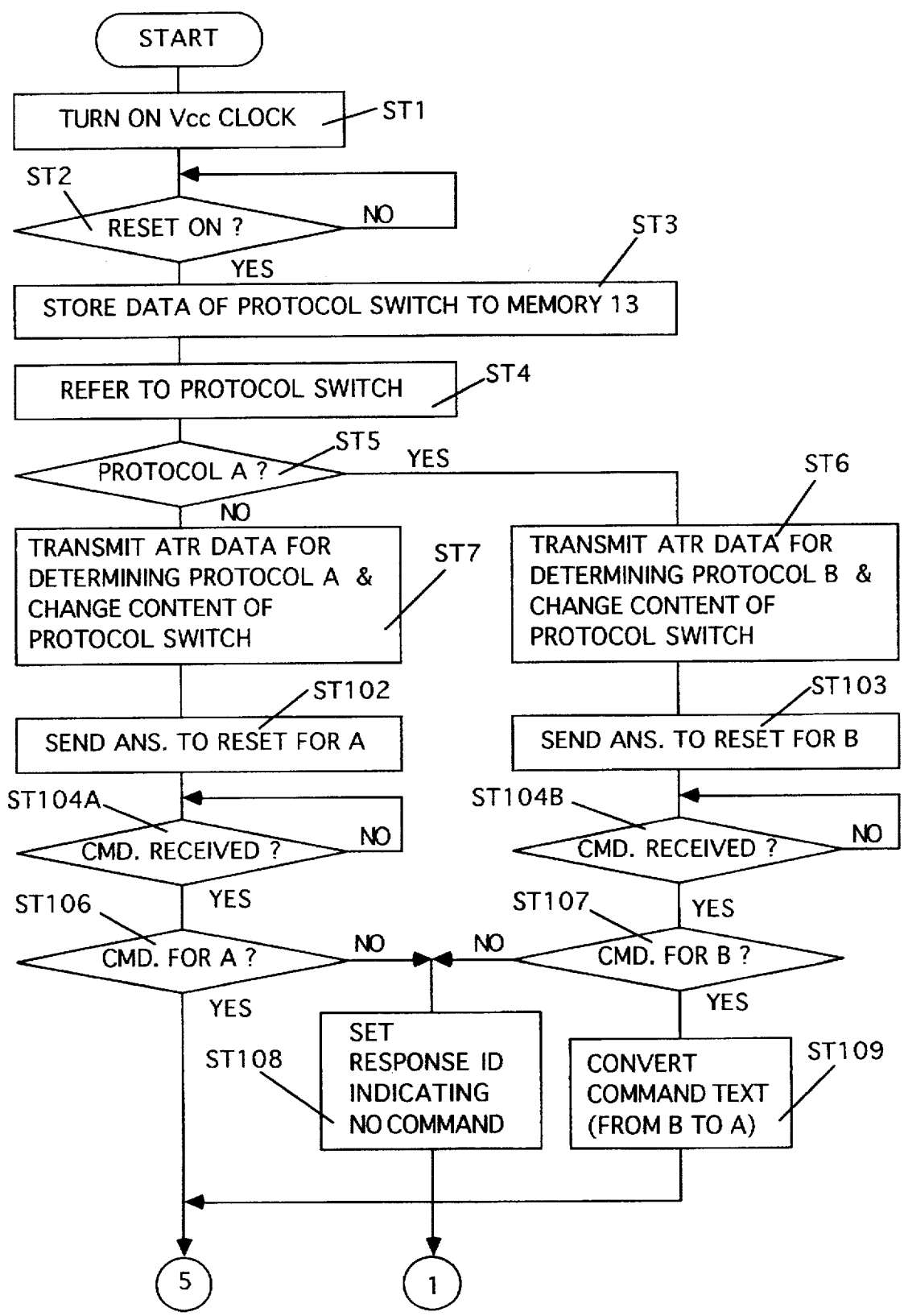
FIG. 13 is a flow chart for explaining a protocol/format switch operation in using the memory card in FIG. 11, which operation is combined with part of the internal card processing in FIGS. 6 and 7.

FIG. 13 is a flow chart for explaining the interlocking operation between a protocol switch and a format switch in using IC card 1 shown in FIG. 11. This protocol/format switch operation is combined with part of the internal card processing shown in FIGS. 6 and 7.

More specifically, if the content of the protocol switch copied to working memory 13 in step ST3 does not correspond to protocol A (NO in step ST5), CPU 11 of IC card 1 transmits ATR data for determining protocol A to the apparatus shown in FIG. 1, and changes the content of the protocol switch copied to working memory 13 to that for protocol A (step ST7). Thereafter, CPU 11 transmits Answer to Reset corresponding to switch A to the apparatus shown in FIG. 1 (step ST102), and waits for a command (step ST104A).

CPU 11 of IC card 1 checks from the formats shown in FIGS. 5E to 5H whether the command received from the apparatus in FIG. 1 is for switch A when 1-byte data stored in control area 120 of data memory 12 indicates switch A (hex "00") (step ST106).

If the received command is not for switch A (NO in step ST106), CPU 11 sends response ID indicating no command (step ST108), and the flow advances to step ST118 in FIG. 7. If the received command is for switch A (YES in step ST106), the flow advances to step ST110 in FIG. 6. Subsequently, the same processing as that described with reference to FIGS. 6 and 7 is performed.

If the content of the protocol switch copied to working memory 13 in step ST3 corresponds to protocol A (YES in step ST5), CPU 11 of IC card 1 transmits ATR data for determining protocol B to the apparatus in FIG. 1, and changes the content of the protocol switch copied to working memory 13 to protocol B (step ST6). Thereafter, CPU 11 transmits Answer to Reset corresponding to switch B to the apparatus in FIG. 1 (step ST103), and waits for a command (step ST104B).

CPU 11 of IC card 1 checks from the formats shown in FIGS. 5A to 5D whether the command received from the apparatus in FIG. 1 is for switch B when 1-byte data stored in control area 120 of data memory 12 indicates switch B (hex "01", "10", or "11") (step ST107).

If the received command is not for switch B (NO in step ST107), CPU 11 sends response ID indicating no command (step ST108), and the flow advances to step ST118 in FIG. 7. If the received command is for switch B (YES in step ST107), the flow advances to step ST105 in FIG. 6. Subsequently, the same processing as that described with reference to FIGS. 6 and 7 is performed.

According to the embodiment shown in FIG. 13, the format of a command/response text can be changed together with a data transmission protocol.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable electronic device for processing a command received from an external device and for outputting a response to the command, the command being a data string that includes data RN that identifies a record number in an associated data area, the command being transmitted between the electronic device and the external device to cause the electronic device to carry out an operation, the device comprising:

identification information storage means for storing identification information representing which one of a first format and a second format the command from the external device and the response to the external device are to be in;

determining means for determining whether the command received from the external device has one of the first format and the second format;

conversion means for converting a command having the second format into a command having the first format responsive to the identification information storage means indicating that the command from the external device is to be in the first format and the determining means determining that the command received from the external device has the second format, the conversion means causing said data RN to be shifted within the data string during the converting process;

processing means for processing one of the command having the first format as received from the external device and a converted command, converted into the first format and output by the conversion means, thereby outputting a processed result;

outputting means for determining whether to output to the external device one of a first response having the first format and a second response having the second format based on the identification information stored in the identification information storage means;

first response generating means for formatting the processed result of the processing means in the first format and providing the processed result having the first format as the first response responsive to the outputting means determining that the first response is to be output; and second response generating means for formatting the processed result of the processing means in the second format and providing the processed result having the second format as the second response responsive to the outputting means determining that the second response is to be output.

2. A portable electronic device according to claim 1, further comprising:

means for exchanging data including the received command, the first response and the second response with the external device using a predetermined protocol.

3. A portable electronic device for processing a command received from an external device and for outputting a response to the command, the command being a data string that includes data RN that identifies a record number in an associated data area, the command being transmitted between the electronic device and the external device that causes the electronic device to carry out an operation, the device comprising:

identification information storage means for storing identification information representing which one of a first format and a second format the command from the external device is to be in;

determining means for determining whether the command has one of the first format, the second format, and another format according to the identification information stored in the identification information storage means and for determining a type of the command;

error response outputting means for outputting an error response responsive to a determination by the determining means that the format of the command received from the external device is of the another format;

conversion means for converting a command having the second format into a command having the first format responsive the identification information storage means indicating that the command from the external device is to be in the first format and to a determination by the determining means that the command is of the second format, the conversion means causing said data RN to be shifted within the data string during the converting process;

processing means for processing one of the command as received from the external device having the first format and a converted command converted into a command having the first format and output by the conversion means, thereby outputting a processed result;

outputting means for determining whether to output to the external device one of a first response having the first format and a second response having the second format based on the identification information stored in the identification information storage means;

first response generating means for formatting the processed result of the processing means in the first format and providing the processed result having the first format as the first response responsive to the outputting means determining that the first response is to be output; and second response generating means for formatting the processed result of the processing means in the second format and providing the processed result having the second format as the second response responsive to the outputting means determining that the second response is to be output.

4. A portable electronic device according to claim 3, further comprising:

means for exchanging data including the received command, the first response and the second response with the external device using a predetermined protocol.

5. An IC card system, comprising:

a portable IC card; and a device, external to the IC card, for providing a command thereto, the command being a data string that includes data RN that identifies a record number in .an associated data area, the command being transmitted between the electronic device and the external device to cause the IC card to carry out an operation, the IC card comprising:

identification information storage means for storing identification information representing which one of a first format and a second format of a command from the external device and a response to the external device are to be in;

determining means for determining whether the command received from the external device has one of the first format and the second format;

conversion means for converting a command having the second format into a command having the first format responsive the identification information storage means indicating that the command from the external device is to be in the first format and to the determining means determining that the command received from the external device has the second format, the conversion means causing said data RN to be shifted within the data string during the converting process;

processing means for processing one of the command having the first format as received from the external device and a converted command, converted into the first format and output by the conversion means, thereby outputting a processed result;

outputting means for determining whether to output to the external device one of a first response having the first format and a second response having the second format based on the identification information stored in the identification information storage means;

first response generating means for formatting the processed result of the processing means in the first format and providing the processed result having the first format as the first response responsive to the outputting means determining that the first response is to be output; and second response generating means for formatting the processed result of the processing means in the second format and providing the processed result having the second format as the second response responsive to the outputting means determining that the second response is to be output.

6. An IC card system according to claim 5, further comprising:

means for exchanging data including the received command, the first response and the second response with the external device using a predetermined protocol.

7. An IC card system, comprising:

an portable IC card; and a device, external to the IC card, for providing a command thereto, the command being a data string that includes data RN that identifies a record number in an associated data area, the command being transmitted between the electronic device and the external device to cause the IC card to carry out an operation, the IC card comprising:

identification information storage means for storing identification information representing which one of a first format and a second format of the command from the external device is to be in;

determining means for determining whether the command has one of the first format, the second format, and another format according to the identification information stored in the identification information storage means and for determining a type of the command;

error response outputting means for outputting an error response responsive to a determination by the determining means that the format of the command received from the external device is of the another format;

conversion means for converting a command having the second format into a command having the first format responsive to the identification information storage means indicating that the command from the external device is to be in the first format and a determination by the determining means that the command is of the second format, the conversion means causing said data RN to be shifted within the data string during the converting process;

processing means for processing one of the command as received from the external device having the first format and a converted command converted into a command having the first format and output by the conversion means, thereby outputting a processed result;

outputting means for determining whether to output to the external device one of first response having the first format and second response having the second format based on the identification information stored in the identification information storage means;

first response generating means for formatting the processed result of the processing means in the first format and providing the processed result having the first format as the first response responsive to the outputting means determining that the first response is to be output; and second response generating means for formatting the processed result of the processing means in the second format and providing the processed result having the second format as the second response responsive to the outputting means determining that the second response is to be output.

8. An IC card system according to claim 7, further comprising:

means for exchanging data including the received command, the first response and the second response with the external device using a predetermined protocol.

* * * * *